(12) United States Patent
Shoda et al.

(10) Patent No.: US 6,513,712 B2
(45) Date of Patent: Feb. 4, 2003

(54) PRODUCT SHIPPING SYSTEM

(75) Inventors: Kan Shoda, Ota (JP); Masaru Fujimoto, Ota (JP)

(73) Assignee: Shigeru Co., Ltd., Tokyo (JP)

( * ) Notice: Subject to any disclaimer, the term of this patent is extended or adjusted under 35 U.S.C. 154(b) by 0 days.

(21) Appl. No.: 10/067,998

(22) Filed: Feb. 8, 2002

(65) Prior Publication Data

US 2002/0109008 A1 Aug. 15, 2002

(30) Foreign Application Priority Data

Feb. 9, 2001 (JP) .......................................... 2001-033235

(51) Int. Cl.$^7$ .................................................. G06K 7/06

(52) U.S. Cl. ........................................ 235/441; 235/451

(58) Field of Search .................................. 235/441, 451

(56) References Cited

U.S. PATENT DOCUMENTS 5,771,003 A * 6/1998 Seymour ..................... 235/441

* cited by examiner

Primary Examiner—Harold I. Pitts
(74) Attorney, Agent, or Firm—Armstrong, Westerman & Hattori LLP

(57) ABSTRACT

By use of a terminal equipment on the side of a purchaser, designation information designating the order in which respective shipping products are to be mounted on a delivery pallet, is transmitted to a terminal equipment on the side of a supplier via a communications line. Upon receiving the designation information, the terminal equipment on the side of the supplier converts the designation information as received into colored partition information by the kind of the respective shipping products, and fixes a form on which the colored partition information after the conversion is color-printed by a color printer to a predetermined spot of the delivery pallet.

The worker refers to the form at the time of loading products and takes out a product mounted on the respective product pallets in the same color as that corresponding to predetermined partitions of the delivery pallet, mounting the respective products in the predetermined partitions of the delivery pallet on top of the respective flat car or plural flat cars. Thus, with the product shipping system according to the invention, it is possible to minimize the risk of the worker making a mistake in the order of mounting products, and to shorten time required for mounting the products in the delivery pallet(s) as partitioned according to the order of mounting, thereby speeding up shipment of the products.

7 Claims, 5 Drawing Sheets

FIG.2

| DR PADS(TC609C) | | | | DR PADS(TC609C) | | | | DR PADS(TC609C) | | |
| --- | --- | --- | --- | --- | --- | --- | --- | --- | --- | --- |
| SEQ | COLOR | FRH | RRH | SEQ | COLOR | FLH | SEQ | COLOR | RLH | |
| 6445 | BEIGE | 52D | 34D | 6445 | BEIGE | 53D | 6445 | BEIGE | 35D | |
| 6446 | BEIGE | 54D | 36D | 6446 | BEIGE | 55D | 6446 | BEIGE | 37D | |
| 6447 | BEIGE | 52D | 34D | 6447 | BEIGE | 53D | 6447 | BEIGE | 35D | |
| 6448 | BEIGE | 54BD | 36BD | 6448 | BEIGE | 55BD | 6448 | BEIGE | 37BD | |
| 6449 | BEIGE | 52D | 34D | 6449 | BEIGE | 53D | 6449 | BEIGE | 35D | |
| 6450 | BEIGE | 52D | 34D | 6450 | BEIGE | 53D | 6450 | BEIGE | 35D | |
| 6451 | BEIGE | 54BD | 36BD | 6451 | BEIGE | 55BD | 6451 | BEIGE | 37BD | |
| 6452 | BEIGE | 54D | 36D | 6452 | BEIGE | 55D | 6452 | BEIGE | 37D | |
| 6453 | BEIGE | 52D | 34D | 6453 | BEIGE | 53D | 6453 | BEIGE | 35D | |
| 6454 | BEIGE | 54BD | 36BD | 6454 | BEIGE | 55BD | 6454 | BEIGE | 37BD | |
| 6455 | BEIGE | 52D | 34D | 6455 | BEIGE | 53D | 6455 | BEIGE | 35D | |
| 6456 | BEIGE | 52D | 34D | 6456 | BEIGE | 53D | 6456 | BEIGE | 35D | |
| 6457 | BEIGE | 54BD | 36BD | 6457 | BEIGE | 55BD | 6457 | BEIGE | 37BD | |
| 6458 | BEIGE | 52D | 34D | 6458 | BEIGE | 53D | 6458 | BEIGE | 35D | |
| 6459 | BEIGE | 54D | 36D | 6459 | BEIGE | 55D | 6459 | BEIGE | 37D | |
| 6460 | BEIGE | 52D | 34D | 6460 | BEIGE | 53D | 6460 | BEIGE | 35D | |
| 6461 | BEIGE | 54D | 36D | 6461 | BEIGE | 55D | 6461 | BEIGE | 37D | |
| 6462 | BEIGE | 52D | 34D | 6462 | BEIGE | 53D | 6462 | BEIGE | 35D | |

FIG.3

PNO 01 | DR RH | | | | |
---|---|---|---|---|---|
1 PINK 52D F R | 2 BLUE 54D F R | 3 PINK 52D F R | 4 YELLOW 54BD F R | 5 PINK 52D F R | 6 PINK 52D F R |
7 YELLOW 54BD F R | 8 BLUE 54D F R | 9 PINK 52D F R | 10 YELLOW 54BD F R | 11 PINK 52D F R | 12 PINK 52D F R |
13 YELLOW 54BD F R | 14 PINK 52D F R | 15 BLUE 54D F R | 16 PINK 52D F R | 17 BLUE 54D F R | 18 PINK 52D F R |

PRODUCT SHIPPING SYSTEM

BACKGROUND OF THE INVENTION

1. Field of the Invention

The invention relates to a product shipping system and a method for shipping products.

2. Description of the Related Art

It has been a conventional practice for a supplier to receive designation information designating the order in which respective shipping products are to be mounted on pallets from a purchaser placing an order via a terminal equipment on the side of the supplier, and to mount the respective shipping products on respective delivery pallet(s) as partitioned following the designation information before shipment.

In case the respective shipping products are randomly mounted on the respective delivery pallets, however, it takes considerable time for a worker to mount the respective shipping products on the respective delivery pallet(s) as partitioned according to the designation information, so that there have arisen problems in that speedy shipment can not be effected, and there is a possibility of the worker making a mistake at times in the order of mounting the respective shipping products.

SUMMARY OF THE INVENTION

In view of those points described above, it is an object of the invention to provide a product shipping system whereby the risk of a worker making a mistake in the order of mounting respective products can be minimized, and time required for mounting the respective products on respective delivery pallet(s) in as partitioned state according to designation information can be shortened, thereby speeding up shipment.

To that end, in accordance with a first aspect of the invention, there is provided a product shipping system comprising a terminal equipment on the side of a purchaser, for transmitting designation information designating the order in which respective shipping products are to be mounted on a delivery pallet, or plural delivery pallets, a terminal equipment on the side of a supplier, connected to the terminal equipment on the side of the purchaser via a dedicated communications line, for receiving the designation information, capable of converting the designation information as received into partition information indicating partitions identifiable by the kind of the respective shipping products by execution of a conversion program, a printer capable of printing out the partition information after conversion by operating the terminal equipment on the side of the supplier, a flat car or plural flat cars for transfer of the respective delivery pallet or plural delivery pallets that display(s) the partition information as printed by the printer, capable of mounting respective products in as-partitioned state thereon, and a plurality of product pallets on the supplier's side, provided with a display identifiable by the kind of the respective shipping products, on which the respective shipping products are mounted by the kind thereof, wherein a worker can select respective products mounted on the respective product pallets provided with the display on the basis of the partition information as displayed on the delivery pallet(s) loaded on the respective flat car(s), and can mount the respective products in as-partitioned state on the respective delivery pallet(s).

Preferably, the printer is a color printer, and the partition information printed out by the printer is colored differently by the kind of the respective shipping products while part or the whole of the product pallet with the respective shipping products mounted thereon has a display colored in the same way as for the partition information.

Preferably, the printer is a color printer, and the partition information printed out by the printer is colored differently by the kind of the respective shipping products while the product pallet with the respective shipping products mounted thereon has a display at a predetermine spot thereof, provided with a label colored in the same way as for the partition information. Further, the flat car(s) for transfer of the respective delivery pallet(s) are preferably made up of a self-driven transfer car and the flat car(s) connected with the self-driven transfer car, each loaded with the delivery pallet provided with a partitioned storage cabinet.

And in accordance with the other aspect of the invention, there is provided a method for product shipping system comprising the following steps:

transmitting designation information by a purchaser designating the order, in which respective shipping products are to be mounted on at least one delivery pallet.

receiving said designation information by a supplier, converting the designation information as received by said supplier into partition information, indicating partitions identifiable by the kind of the respective shipping products, by means of a conversion program, printing out the partition information after conversion, displaying the partition information as printed at said delivery pallet(s), capable of mounting respective products in as-partitioned state thereon, displaying an identification by the kind of the respective shipping products or a plurality of product pallets on which the respective shipping products are mounted by the kind thereof on the supplier's side, selecting respective products mounted on the respective product pallets provided with the display on the basis of the partition information as displayed on the at least one delivery pallet and mounting the respective product in as-partitioned state on the respective delivery pallet or plural delivery pallets.

BRIEF DESCRIPTION OF THE DRAWINGS

FIG. 2 is a view showing information designating the order in which respective products are to be mounted on a delivery pallet;

FIG. 3 is a view showing colored partition information;

DETAILED DESCRIPTION OF THE PREFERRED EMBODIMENTS

Figure 1:
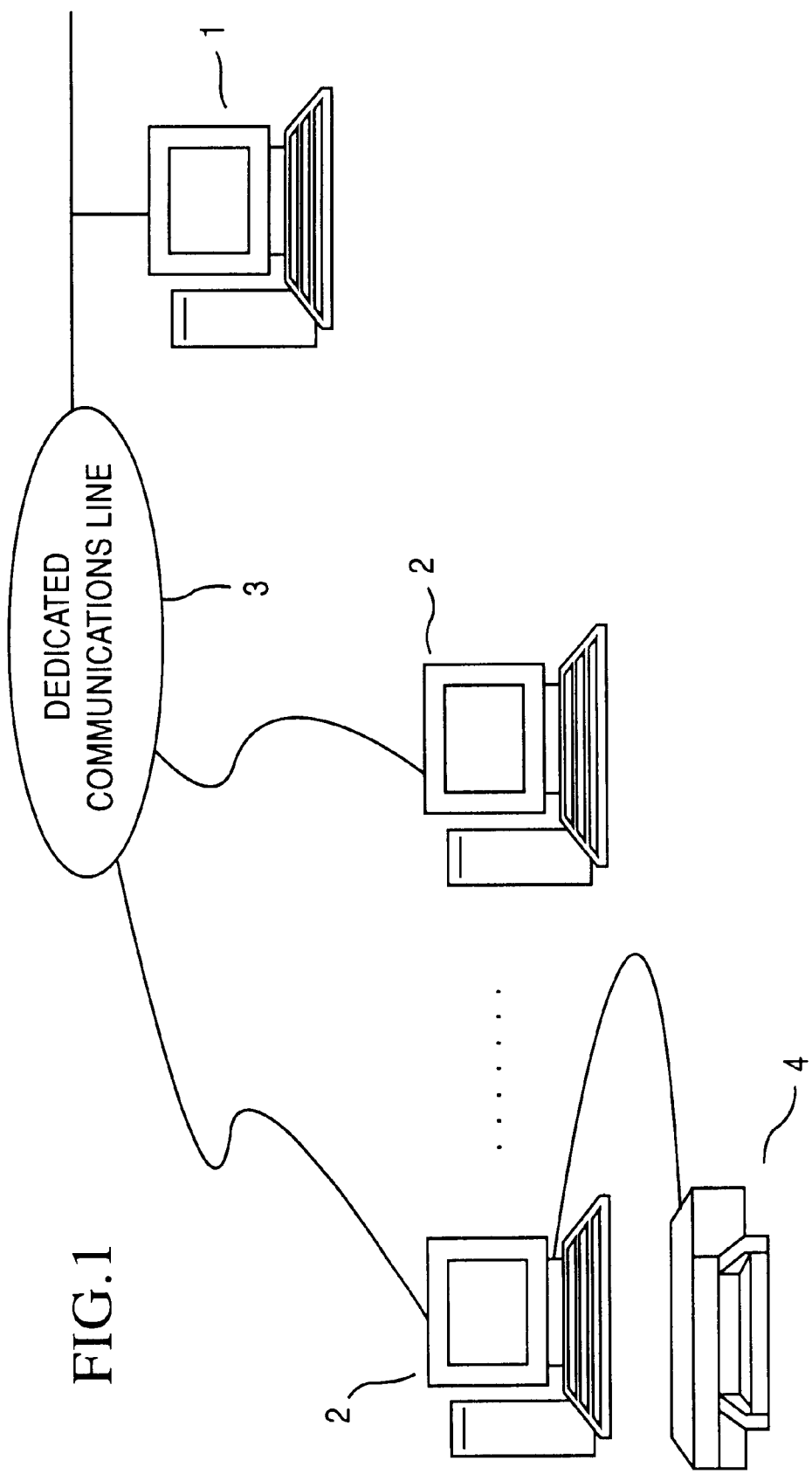
FIG. 1 is a block diagram of an embodiment of a product shipping system according to the invention.

A first embodiment of a product shipping system according to the invention is described hereinafter with reference to the accompanying drawings. First, based on the block diagram of the product shipping system, shown in FIG. 1, description is given. Reference numeral 1 denotes a terminal equipment on the side of a purchaser, which is, for example, a personal computer, transmitting designation information (refer to FIG. 2) stored in a hard disk or RAM (random access memory), designating the order in which respective shipping products, for example, a car door, are to be mounted on respective delivery pallet(s). Reference numeral 2 denotes a terminal equipment on the side of a supplier, which is, for example, a personal computer, connected to the terminal equipment 1 on the side of the purchaser via a dedicated communications line 3 which is a communications line. The terminal equipment 2 receives the designation information from the terminal equipment 1 on the side of the purchaser via the dedicated communications line 3 which is the communications line, and stores the designation information in its own hard disk or RAM (random access memory) while converting the designation information as received into colored partition information (refer to FIG. 3) indicating partitions colored differently by the kind of the respective shipping products by execution of a conversion program stored in its own ROM (read only memory), storing thereafter the colored partition information after the conversion in the RAM (random access memory). Reference numeral 4 denotes a color printer capable of printing out the colored partition information after the conversion by operating the terminal equipment 2 on the side of the supplier.

A form on which the colored partition information is color-printed by the color printer 4 is put in, for example, a transparent case, which is either hung from a predetermined spot of respective delivery pallet(s) 12 as described later or removably fixed to the predetermined spot such that a worker can refer to the colored partition information at the time of mounting respect products as described later.

The respective shipping products are mounted in sequence on the delivery pallet 12 on top of a flat car 11A in accordance with the colored partition information, and the layout of the colored partition information is identical to the placement of partitions of the delivery pallet 12. To be more specific about the colored partition information, mounting sequence number "1" is assigned to the leftmost part in the uppermost row, and "6" to the rightmost part in the uppermost row, mounting sequence number "7" is assigned to the leftmost part in the middle row, and "12" to the rightmost part in the middle row, and mounting sequence number "13" is assigned to the leftmost part in the bottom row, and "18" to the rightmost part in the bottom row.

The colored partition information shown in FIG. 3 represents conversion of information given in the leftmost column of information shown in FIG. 2, designating the sequence in which the respective shipping products are to be mounted on the respective delivery pallet(s). For example, partitions in FIG. 3, assigned with the mounting sequence number "1", "3", "5", "6", "9", "11", "12", "14", "16" and "18" respectively, signifies the need for mounting therein a front door ("FRH") on the right-hand side of an automobile, with type no. "52D" colored in beige, and letter pink is provided inside the frame of the respective partitions, the frames themselves being colored in pink.

Similarly, partitions assigned with the mounting sequence number "2", "8", "15" and "17" respectively, signifies the need for mounting therein a front door ("FRH") on the right-hand side of an automobile, with type no. "54D", colored in beige, and letter "blue" is provided inside the frame of the respective partitions, the frames themselves being colored in blue. Similarly, partitions assigned with the mounting sequence number "4", "7", "10" and "13" respectively, signifies the need for mounting therein a front door ("FRH") on the right-hand side of an automobile, with type no. "54BD" colored in beige, and letter "yellow" is provided inside the frame of the respective partitions, the frames themselves being colored in yellow.

Similarly, the contents of information given in the second column from the leftmost column are converted respectively, and converted information signifies that the leftmost part in the uppermost row of delivery pallet 12 on top of the next flat car 11B corresponds to a partition assigned with mounting sequence number "1" and a rear door ("RRH") on the right-hand side of an automobile, with type no. "34D" colored in beige, needs to be mounted with letter "green" provided inside the frame of the partition, the frame itself being colored in green. Information in the third column in FIG. 2 signifies the need for mounting front doors ("F LH") on the left-hand side of an automobile, with type no. "53D" and so forth while information in the fourth column signifies the need for mounting rear doors ("RLH") on the left-hand side of an automobile, with type no. "35D" and so forth, different colors being provided by the type no.

Figure 4:
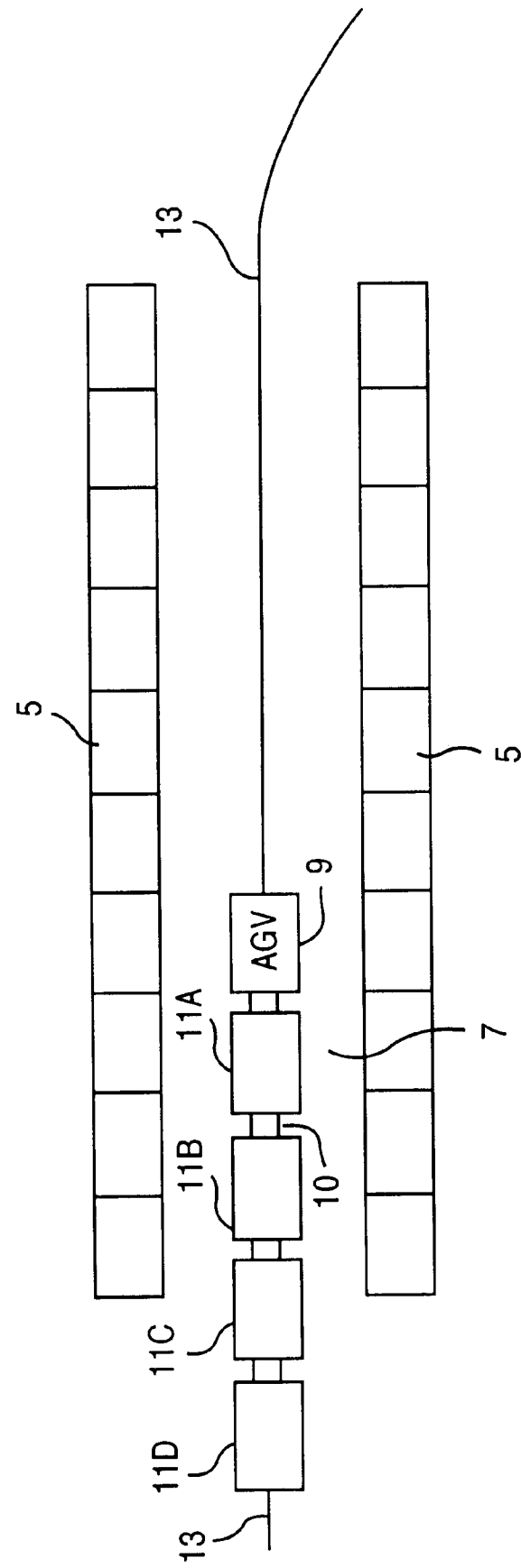
FIG. 4 is a schematic plan view showing groups of product pallets and transfer flat cars.

Now, description is given with reference to FIG. 4. Reference numeral 5 denotes a product pallet. The product pallet 5 is provided with a color display serving as a display colored differently by the kind of the respective shipping products, and the kinds of such colors are the same as those in the colored partition information. The supplier mounts products to be shipped on the respective product pallets 5 according to the kinds of the products.

More specifically, part (for example, the upper surface) or the whole of the respective product pallets 5 is colored differently by the kind of the products to be shipped so as to serve as a color display or a label colored differently by the kind of the products to be shipped is attached to a predetermine spot of the product pallet 5 so as to serve as a color display. A worker on the supplier's side checks if the color display of the respective product pallets 5 is in a color corresponding to the kind of respective products manufactured, and mounts the products on the respective delivery pallet(s) 12. Now, a plurality of the product pallets 5 are juxtaposed in two rows so as to face each other, however, it is not necessarily a case where the products with the same type no. are grouped together. The products are placed on the respective delivery pallets 12 from the direction crossing a transfer direction at right angles, and in this case, the products can be preferably placed thereon from either one side or both sides.

Figure 5:
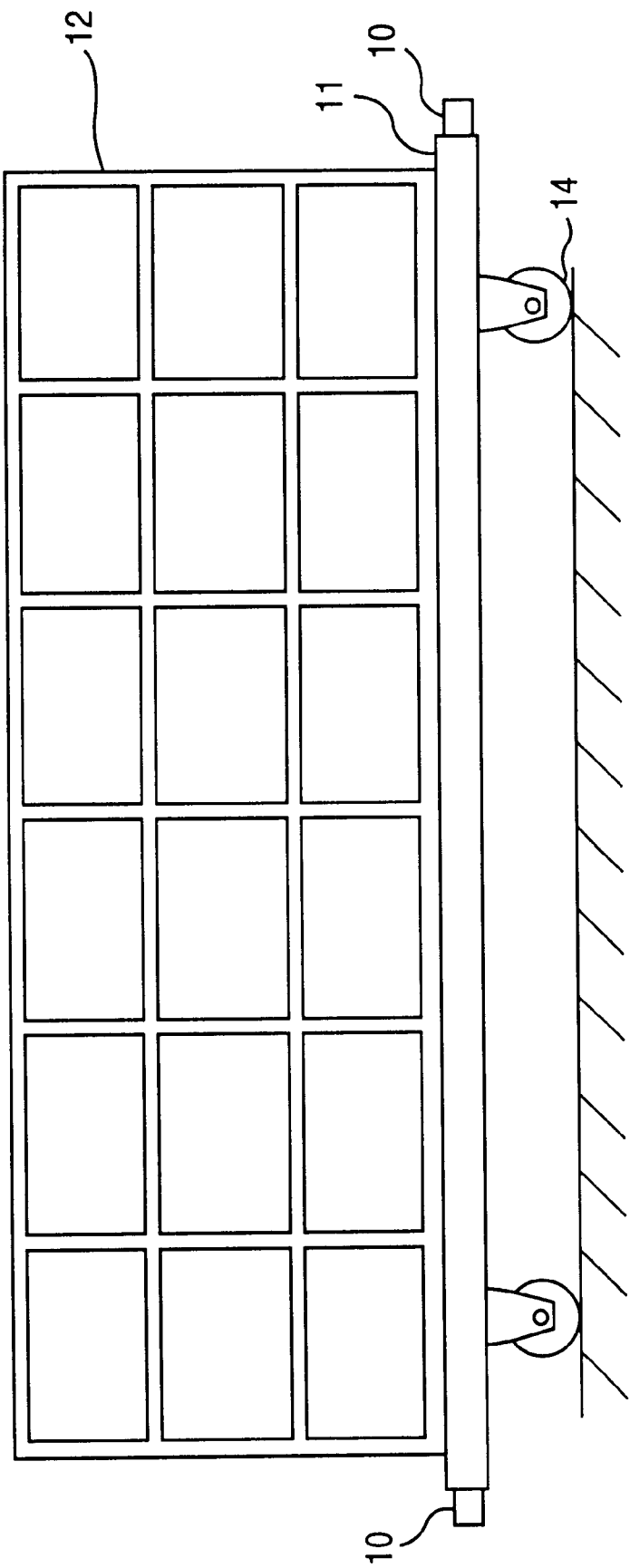
FIG. 5 is a side view of the transfer flat car and the delivery pallet.

Reference numeral 7 denotes a transfer flat car train moving between groups of the product pallets 5 juxtaposed in two rows, and the transfer flat car train 7 is used to transfer the delivery pallet(s) 12 displaying the colored partition information as color-printed by the color printer 4, and capable of mounting the products in as-partitioned state thereon. More specifically, the transfer flat car train 7 is comprised of a self-driven transfer car 9 and the flat car(s) 11 rotatably connected with the self-driven transfer car 9 via a well-known coupler 10, respectively. The delivery pallet 12 provided with a partitioned storage cabinet is mounted on each of the flat car(s) 11 having casters 14, and the flat car(s) 11 as well are rotatably connected with each other via a well-known coupler 10, respectively (refer to FIG. 5). The delivery pallet 12 may be manufactured in one piece or in plural dividable pieces connected, depending on numbers of a partitioned storage cabinet. The delivery pallet 12 and the flat car 11 may be manufactured in one piece or they may be connected with each other after manufacturing themselves separately and mounting the delivery pallet 12 on to the flat car 11.

The self-driven transfer car 9 is a self-driven transfer car made up of a well-known AGV (automated guided vehicle), and is moved by a driving source, not shown, along a traveling line 13 made up of a magnetic tape, laid down between the groups of the product pallets 5 juxtaposed in two rows.

In this connection, a stop station may be installed between the groups of the product pallets 5 juxtaposed in two rows, thereby allowing the self-driven transfer car 9 to stop at the stop station. With this embodiment of the invention, it is arranged such that the self-driven transfer car 9 is not allowed to stop, but to move slowly for the worker's convenience in an operation to mount the products.

Now, operation of the embodiment constituted as described in the foregoing will be described hereinafter. By use of the terminal equipment 1 on the side of the purchaser, the designation information (refer to FIG. 2) stored in the hard disk or RAM (random access memory) thereof, designating the order in which respective shipping products, for example, a car door, are to be mounted on the delivery pallet, is transmitted to the terminal equipment 2 on the side of the supplier via the dedicated communications line 3. Upon receiving the designation information, the terminal equipment 2 on the side of the supplier stores the designation information in its own hard disk or RAM (random access memory) while converting the designation information as received into the colored partition information (refer to FIG. 3) indicating partitions colored differently by the kind of the respective shipping products by execution of a conversion program stored in its own ROM (read only memory), and storing the colored partition information after the conversion in the RAM (random access memory).

Then, the colored partition information is printed out with the color printer 4 by operating the terminal equipment 2 on the side of the supplier. The worker puts the form on which the colored partition information is color-printed in the transparent case, and either hangs the transparent case from the predetermined spot (or a plurality of spots) of the delivery pallet(s) 12 or removably fixes the same to the predetermined spot.

Accordingly, the worker refers to the form of the colored partition information at the time of loading products and mounts respective products already manufactured and loaded in the product pallet 5 on the respective delivery pallet(s) 12 in as-partitioned state on top of the respective flat car(s) 11.

That is, the worker sequentially mounts the respective shipping products in accordance with the colored partition information while keeping the self-driven transfer car 9 on the move. The layout of the colored partition information is identical to the placement of the partitions of the respective delivery pallet(s) 12. For example, the partitions in FIG. 3, assigned with the mounting sequence number "1", "3", "5", "6", "9", "11", "12", "14", "16", and "18" respectively, signifies the need for mounting therein a front door ("FRH") on the right-hand side of an automobile, with type no. "52D", colored in beige, and since the letter "pink" is provided inside the frame of the respective partitions, and the frames themselves are colored in pink, the worker sequentially mounts a product placed on the product pallet 5, that is, a right front door with type no. "52D" colored in beige, in a predetermined partition of the respective delivery pallet(s) 12 while checking the product pallets 5 provided with the color display in pink.

Similarly, the worker sequentially mounts, in a predetermined partition of the respective delivery pallet(s) 12, a product placed on the product pallet 5, that is, a right front door with type no. "54D" colored in beige, in the partitions assigned with the mounting sequence number "2", "8", "15", and "17" respectively, while checking the product pallets 5 provided with the color display in "blue" and a product placed on the product pallet 5, that is, a right front door with type no. "54BD", colored in beige, in the partitions assigned with the mounting sequence number "4", "7", "10" and "13" respectively, while checking the product pallets 5 provided with the color display in "yellow".

Mounting of the products in the order of respective colors is described in the foregoing, however, the order of mounting is not limited thereto, and mounting may be executed in the order of the mounting sequence number. Further, mounting may be executed without a predetermined order.

Subsequently, following the colored partition information corresponding to the second column, the third column, and the fourth column from the leftmost column in FIG. 2, respectively, mounting is similarly executed on the delivery pallet 12 on top of the respective flat cars 11B, 11C, and 11D.

The layout of the colored partition information needs not necessarily be identical to the placement of the partitions of the delivery pallet 12, however, if colors in the colored partition information is identical to the colors of the color display of the product pallet 5, this is quite obvious to the worker, thereby enabling him to promptly identify a product with the type no. to be mounted, and preventing him from mounting a product with a wrong no. inadvertently.

Further, with this embodiment, identification of the type no. of a product is made by use of the same color for both the partition information and the display of the product pallet 5, however, the identification of the type no. of a product is not limited thereto, and may be made by characters, graphics, signals, combination thereof, or combination of those and colors.

While the preferred embodiment of the present invention has been described, it is to be understood that various changes, modifications or variations will be apparent to those skilled in the art, and such various changes, modifications or variations should be considered to be within the scope of the invention without departing from the spirit of the invention.

As described hereinbefore, with the product shipping system according to the invention, it is possible to minimize the risk of the worker making a mistake in the order of mounting products, and to shorten time required for mounting the products in the delivery pallets as partitioned according to the order of mounting, thereby speeding up shipment of the products.

What is claimed is:

1. A product shipping system comprising:
   a terminal equipment on the side of a purchaser, for transmitting designation information designating the order in which respective shipping products are to be mounted on a delivery pallet or plural delivery pallets,
   a terminal equipment on the side of a supplier, connected to the terminal equipment on the side of the purchaser via a communications line, for receiving the designation information, capable of converting the designation information as received into partition information indicating partitions identifiable by the kind of the respective shipping products by execution of a conversion program;
   a printer capable of printing out the partition information after conversion by operating the terminal equipment on the side of the supplier;
   a flat car or plural flat cars for transfer of the respective delivery pallet or plural delivery pallets that display(s) the partition information as printed by the printer, capable of mounting respective products in as-partitioned state thereon; and
   a plurality of product pallets provided with a display identifiable by the kind of the respective shipping products, on which the respective shipping products are mounted by the kind thereof on the supplier's side;

wherein a worker can select respective products mounted on the respective product pallets provided with the display on the basis of the partition information as displayed on the delivery pallet or plural delivery pallets loaded on the respective flat car or plural flat cars, and can mount the respective products in as-partitioned state on the respective delivery pallet or plural delivery pallets.

2. The product shipping system according to claim 1, wherein the printer is a color printer, and the partition information printed out by the printer is colored differently by the kind of the respective shipping products while part or the whole of the product pallet with the respective shipping products mounted thereon has a display colored in the same way as for the partition information.

3. The product shipping system according to claim 1, wherein the printer is a color printer, and the partition information printed out by the printer is colored differently by the kind of the respective shipping products while the product pallet with the respective shipping products mounted thereon has a display at a predetermine spot thereof, provided with a label colored in the same way as for the partition information.

4. The product shipping system according to claim 1, wherein the flat car or plural flat cars for transfer of the respective delivery pallet or plural delivery pallets is/are preferably made up of a self-driven transfer car and the flat car(s) connected with the self-driven transfer car, each loaded with the delivery pallet provided with a partitioned storage cabinet.

5. The product shipping system according to claim 2, wherein the flat car or plural flat cars for transfer of the respective delivery pallet or plural delivery pallets is/are preferably made up of a self-driven transfer car and the flat car(s) connected with the self-driven transfer car, each loaded with the delivery pallet provided with a partitioned storage cabinet.

6. The product shipping system according to claim 3, wherein the flat car or plural flat cars for transfer of the respective delivery pallet or plural delivery pallets is/are preferably made up of a self-driven transfer car and the flat car(s) connected with the self-driven transfer car, each loaded with the delivery pallet provided with a partitioned storage cabinet.

7. Method for shipping products comprising the following steps:

transmitting designation information by a purchaser designating the order, in which respective shipping products are to be mounted on at least one delivery pallet, receiving said designation information by a supplier, converting the designation information as received by said supplier into partition information, indicating partitions identifiable by the kind of the respective shipping products, by means of a conversion program, printing out the partition information after conversion, displaying the partition information as printed at said delivery pallet(s), capable of mounting respective products in as-partitioned state thereon, displaying an identification by the kind of the respective shipping products or a plurality of product pallets on which the respective shipping products are mounted by the kind thereof on the supplier's side, selecting respective products mounted on the respective product pallets provided with the display on the basis of the partition information as displayed on the at least one delivery pallet and mounting the respective product in as-partitioned state on the respective delivery pallet or plural delivery pallets.

* * * * *